US011385460B2

(12) United States Patent
Chang et al.

(10) Patent No.: US 11,385,460 B2
(45) Date of Patent: Jul. 12, 2022

(54) ABSORPTIVE FILM FOR STRAY LIGHT MANAGEMENT

(71) Applicant: GM Global Technology Operations LLC, Detroit, MI (US)

(72) Inventors: Kai-Han Chang, Madison Heights, MI (US); Thomas A. Seder, Fraser, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 546 days.

(21) Appl. No.: 16/363,536

(22) Filed: Mar. 25, 2019

(65) Prior Publication Data
US 2020/0310113 A1 Oct. 1, 2020

(51) Int. Cl.
*G02B 27/01* (2006.01)
*G02B 1/118* (2015.01)
*B60K 35/00* (2006.01)

(52) U.S. Cl.
CPC .......... *G02B 27/0101* (2013.01); *G02B 1/118* (2013.01); *B60K 35/00* (2013.01); *B60K 2370/334* (2019.05); *G02B 2027/0118* (2013.01)

(58) Field of Classification Search
CPC .... G02B 27/01; G02B 27/0101; G02B 27/28; G02B 2027/0118; G02B 2027/012; G02B 2027/0121; G02B 1/11; G02B 1/118; G02B 5/0808; G02B 5/003; B60K 2370/334; B60K 35/00; B60K 37/00; B60K 37/02; B60K 37/04; B60Q 3/10; B29D 11/0073; G02F 1/133502

(Continued)

(56) References Cited

U.S. PATENT DOCUMENTS 10,114,217 B2 10/2018 Seder et al.
2013/0194674 A1 * 8/2013 Horiuchi ............ G02B 27/0101
359/631

(Continued)

FOREIGN PATENT DOCUMENTS

CN 109507799 A 3/2019

OTHER PUBLICATIONS

Volkmar Boerner; Microstructured Light Management Films for Information Displays Generated by Holography; SID 02 Digest; 2002; pp. 826-829; 24.1; Freiburg, Germany.

(Continued)

*Primary Examiner* — Stephone B Allen
*Assistant Examiner* — Jyotsna V Dabbi
(74) *Attorney, Agent, or Firm* — Quinn IP Law

(57) ABSTRACT

A head-up display system includes a housing having an interior surface and defining a cavity configured for receiving a ray of light. The head-up display system also includes a lens disposed within the cavity and configured for reflecting the ray of light towards the interior surface. Further, the head-up display system includes a first cured film formed from a coating composition, disposed on the interior surface, and configured for absorbing a ray of light within the cavity. The head-up display system also includes a second deposited film formed by an ionized gas treatment of the first cured film. The second deposited film is configured for transmitting the ray of light to the first cured film to thereby minimize scatter of the ray of light within the cavity. A device including the head-up display system is also described.

20 Claims, 3 Drawing Sheets

(58) Field of Classification Search
USPC .......................................................... 359/614
See application file for complete search history.

(56) References Cited

U.S. PATENT DOCUMENTS

| 2017/0038584 A1* | 2/2017 | Ferris .................... G02B 1/118 |
| 2018/0224578 A1* | 8/2018 | Kajiya ................... G02B 1/118 |
| 2018/0239133 A1* | 8/2018 | Seder .................. G02B 5/3083 |
| 2019/0086670 A1 | 3/2019 | Ishida |

OTHER PUBLICATIONS

Kohel Mizuno, Juntaro Ishii, Hideo Kishida, Yuhei Hayamizu, Satoshi Yasuda, Don N. Futaba, Motoo Yumura, Kenji Hata; A Black Body Absorber from Vertically Aligned Single-Walled Carbon Nanotubes; PNAS (www.pnas.org/cgi/doi/10.1073/pnas.0900155106); Apr. 14, 2009; pp. 6044-6077; vol. 106, No. 15.

U. Schulz, P. Munzert, R. Leitel, N. Bollwahn, I. Wendling, N. Kaiser, A. Tunnermann, New Plasma Processes for Antireflective Structures on Plastics; Proceedings of Society of Photo-Optical Instrumentation Engineers—SPIE Digital Library (https://doi.org/10.1117/12.796705), Advances in Optical Thin Films III; Sep. 25, 2008; 3 pages; vol. 7101; pp. 710107-1-701007-6; Glasgow, Scotland.

Susanne Gaumitz; AR-plas—Antireflex-Schichten fur Kunststoffoptiken, Article from Jenoptik Polymer Systems, GmbH, 007xxx-001-99-14-1215-de, 2 pages, downloaded from www.jenoptik.com/oes on Dec. 21, 2018, otherwise undated; Triptis, Germany.

\* cited by examiner

ABSORPTIVE FILM FOR STRAY LIGHT MANAGEMENT

INTRODUCTION

The disclosure relates to a head-up display system and a device.

A head-up display or HUD is a transparent display that presents data to an operator of a device, such as a vehicle or a component, without requiring the operator to look away from a given field of view. For example, a HUD for an automotive vehicle may present speedometer data, tachometer data, fuel level data, and/or navigational data to a driver as the driver looks straight ahead through a windshield of the automotive vehicle. Similarly, a HUD for an aircraft may present altitude, airspeed, heading, and/or a horizon line to a pilot as the pilot looks straight ahead through a windshield or canopy of the aircraft. Likewise, a HUD for a helmet, visor, goggles, or eyeglasses may present images and/or text to a wearer through a lens of the helmet, visor, goggles, or eyeglasses.

SUMMARY

A head-up display system includes a housing having an interior surface and defining a cavity configured for receiving a ray of light. The head-up display system also includes a lens disposed within the cavity and configured for reflecting the ray of light towards the interior surface. In addition, the head-up display system includes a first cured film formed from a coating composition, disposed on the interior surface, and configured for absorbing the ray of light within the cavity. The head-up display system further includes a second deposited film formed from an ionized gas composition and disposed on the first cured film. The second deposited film is configured for transmitting the ray of light to the first cured film to thereby minimize scatter of the ray of light within the cavity.

In one aspect, the first cured film may be at least partially light-reflective and may have a first structure including a first plurality of peaks and a first plurality of troughs each defined between adjacent ones of the first plurality of peaks. Each of the first plurality of peaks may have a first height of less than 1 mm such that the first structure may be measurable on a sub-millimeter scale.

In another aspect, the second deposited film may be antireflective such that the second deposited film may transmit at least some of the ray of light to the first cured film. The second deposited film may have a moth-eye structure including a second plurality of peaks and a second plurality of troughs each defined between adjacent ones of the second plurality of peaks. Each of the second plurality of peaks may have a second height of less than 1 micron such that the moth-eye structure is measurable on a sub-micron scale.

In one aspect, each of the second plurality of peaks may have a second height of from 10 nm to 100 nm such that the moth-eye structure may be measurable on a nanometer scale. The second deposited film may have a thickness of from 35 µm to 65 µm, and the second deposited film may be configured for minimizing a Fresnel reflection of the ray of light from the first cured film such that the housing is light-absorptive.

In another aspect, each of the second plurality of peaks may have a second height, a second width, and an aspect ratio of the second height to the second width of greater than or equal to 2:1. Further, the second deposited film may be formed on the first cured film by argon ion plasma etching.

In one embodiment, a head-up display system includes a housing having an interior surface and defining a cavity configured for receiving a solar ray of light. The head-up display system also includes a projector configured for emitting a first ray of light into the cavity. In addition, the head-up display system includes a lens disposed within the cavity and facing the projector, wherein the lens is configured for reflecting the first ray of light and the solar ray of light towards the interior surface. Further, the head-up display system includes a first cured film formed from a coating composition, disposed on the interior surface, and configured for absorbing the first ray of light and the solar ray of light within the cavity. The head-up display system also includes a second deposited film formed from an ionized gas composition and disposed on the first cured film. The second deposited film is configured for transmitting the first ray of light and the solar ray of light to the first cured film to thereby minimize scatter of the first ray of light and the solar ray of light within the cavity.

In one aspect, the first cured film may be at least partially light-reflective such that the first cured film may not absorb at least some of the solar ray of light and at least some of the first ray of light. The second deposited film may be antireflective such that the second deposited film may transmit at least some of the solar ray of light and at least some of the first ray of light to the first cured film.

In another aspect, the first cured film may have a first structure including a first plurality of peaks and a first plurality of troughs each defined between adjacent ones of the first plurality of peaks. The second deposited film may have a moth-eye structure including a second plurality of peaks and a second plurality of troughs each defined between adjacent ones of the second plurality of peaks.

In a further aspect, each of the second plurality of peaks may have a second height of from 10 nm to 100 nm such that the moth-eye structure may be measurable on a nanometer scale. Further, each of the first plurality of peaks may have a first height of less than 1 mm such that the first structure is measurable on a sub-millimeter scale.

In an additional aspect, each of the second plurality of peaks may have a second height, a second width, and an aspect ratio of the second height to the second width of greater than or equal to 2:1.

A device includes a windshield, an operator eyebox spaced apart from the windshield, and a head-up display system configured for producing a primary image visible at the windshield when viewed from the operator eyebox. The head-up display system includes a housing having an interior surface and defining a cavity configured for receiving a ray of light, and a lens disposed within the cavity and configured for reflecting the ray of light towards the interior surface. The head-up display system also includes a first cured film formed from a coating composition, disposed on the interior surface, and configured for absorbing the ray of light within the cavity. In addition, the head-up display system includes a second deposited film formed from an ionized gas composition and disposed on the first cured film. The second deposited film is configured for transmitting the ray of light to the first cured film to thereby minimize scatter of the ray of light within the cavity and produce the primary image within the operator eyebox.

In one aspect, the housing may have a plurality of interior surfaces and the first cured film may be disposed on each of the plurality of interior surfaces. The first cured film may have a first structure including a first plurality of peaks and a first plurality of troughs each defined between adjacent ones of the first plurality of peaks. Further, each of the first plurality of peaks may have a first height of less than 1 mm such that the first structure may be measurable on a sub-millimeter scale.

In another aspect, the second deposited film may have a moth-eye structure including a second plurality of peaks and a second plurality of troughs each defined between adjacent ones of the second plurality of peaks. Further, each of the second plurality of peaks may have a second height of from 10 nm to 100 nm such that the moth-eye structure may be measurable on a nanometer scale.

In a further aspect, the second deposited film may have a thickness of from 35 µm to 65 µm, and the second deposited film may be configured for minimizing a Fresnel reflection of the ray of light from the first cured film such that the housing is light-absorptive.

The above features and advantages and other features and advantages of the present disclosure will be readily apparent from the following detailed description of the preferred embodiments and best modes for carrying out the present disclosure when taken in connection with the accompanying drawings and appended claims.

DETAILED DESCRIPTION

Figure 1:
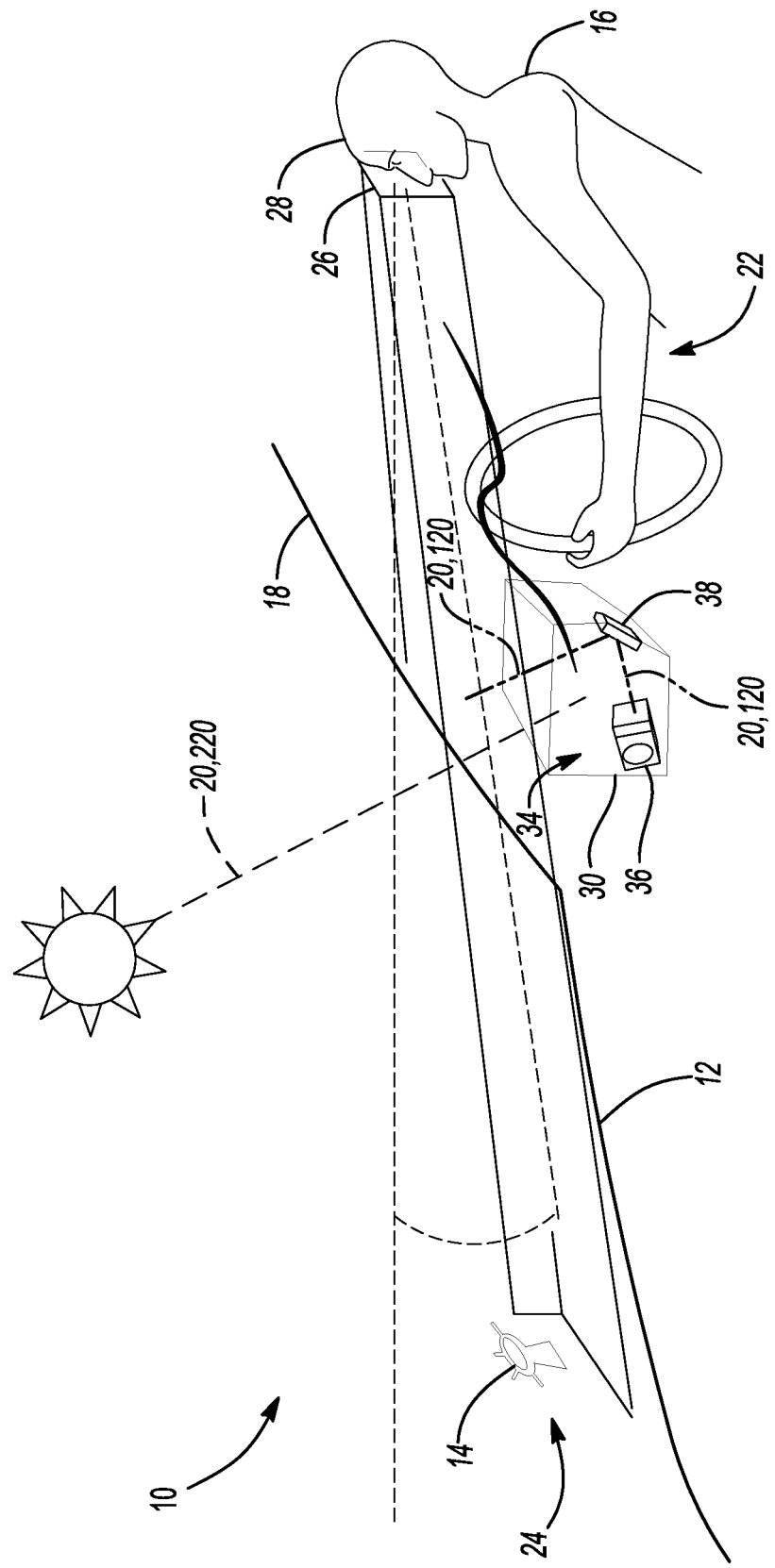
FIG. 1 is a schematic illustration of a side view of a device including a head-up display system.
Figure 2:
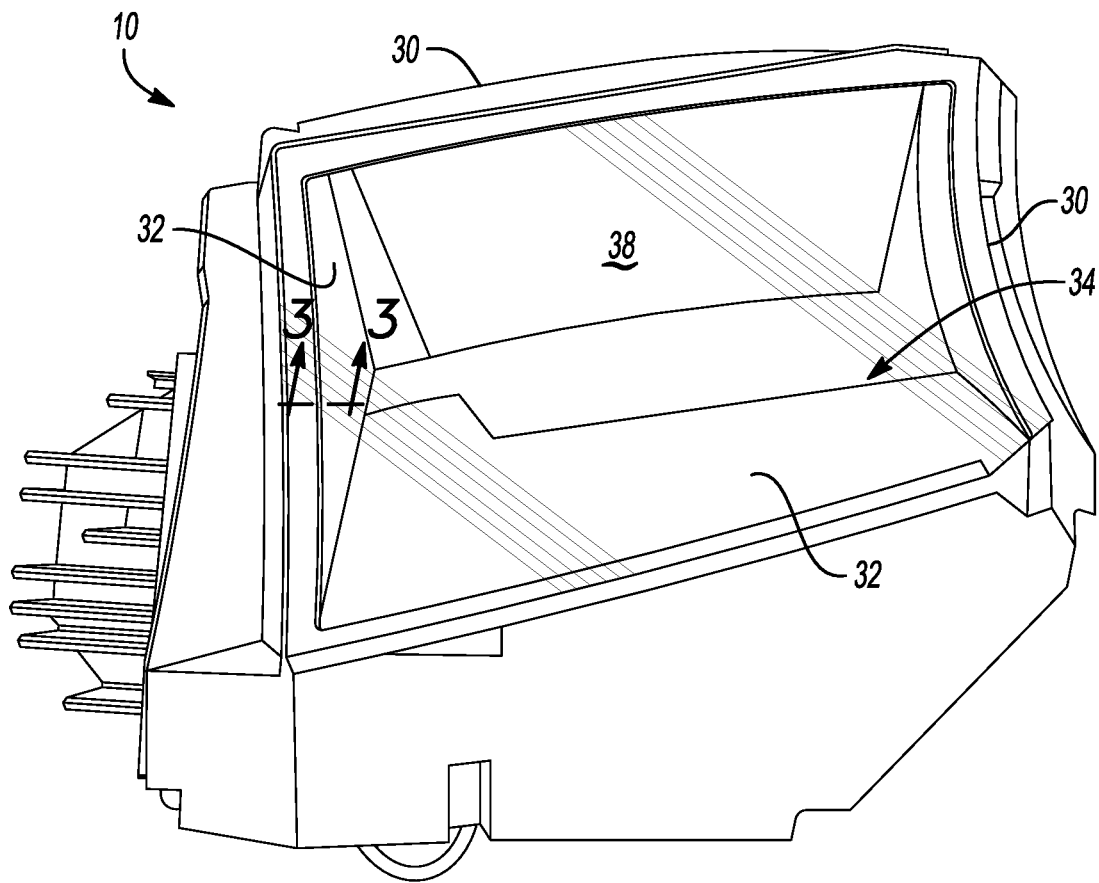
FIG. 2 is a schematic illustration of a perspective view of the head-up display system of FIG. 1 including an interior surface.

Referring to the Figures, wherein like reference numerals refer to like elements, a head-up display system 10 for a device 12 is shown generally in FIGS. 1 and 2. The head-up display system 10 may be useful for presenting data such as a primary image 14 to an operator 16 of the device 12 without requiring the operator 16 to look away from a given field of view. For example, the device 12 may be a vehicle, such as an automotive vehicle or an aircraft, or may be a component, such as a helmet or eyeglasses. The head-up display system 10 may reflect the primary image 14 from a transparent element, such as a windshield 18 (FIG. 1), a cockpit canopy (not shown), a visor of a helmet (not shown), or a lens of eyeglasses (not shown), and may effectively manage solar load and stray or scattered light 300 (FIG. 3) within the head-up display system 10. Such reflection of the primary image 14 makes the primary image 14 appear to be in front of the transparent element.

Further, the head-up display system 10 presents high-contrast, bright, crisp, and clear primary images 14 which are substantially free from lack of contrast, lack of crispness, lack of clarity, ghosting, and visible grayness. In particular and as set forth in more detail below, the head-up display system 10 minimizes low contrast images caused by stray or scattered light 300 (FIG. 3) within the head-up display system 10. For example, the head-up display system 10 presents a clear primary image 14 having minimal grayness in areas of the primary image 14 that are intended to be black in color and excellent image crispness, all while managing stray or scattered light 300 and thermal energy from sunlight. Further, the head-up display system 10 avoids capturing and reflecting thermal radiation from the sun into the eyes of the operator 16 and instead absorbs light (as represented generally at 400 in FIG. 4).

As referenced herein, the terminology lack of contrast may refer to a condition in which an image is not clear and crisp, but may instead appear gray or dull. That is, lack of contrast may be caused by stray or scattered light 300 (FIG. 3) that is reflected within the cavity 34 and may diminish a crispness of the primary image 14. Further, to clarify, ghosting as referenced herein is distinguished from a windshield ghost image (not shown). That is, the windshield ghost image may occur due to reflection of the primary image 14 off an outer surface of the windshield 18 and may be remedied by, for example, laminating a wedge-shaped element between inner and outer windshield layers. The ghosting discussed herein would otherwise originate from scattering of a ray of light 20, e.g., a first ray of light 120 (FIG. 1) and/or a solar ray of light 220 (FIG. 1), that reaches the head-up display system 10 during operation, as set forth in more detail below.

Referring again to FIG. 1, in one embodiment, the device 12 may be an automotive vehicle such as a passenger car or truck. Alternatively, the device 12 may be another vehicle type, such as, but not limited to, an industrial vehicle, a recreational off-road vehicle, a motorcycle, and the like. The device 12 includes the windshield 18 that may be configured for protecting the operator 16 from debris and/or moisture while the device 12 is in motion or use. The windshield 18 may be formed from a plurality of layers (not shown) that are laminated together, and the windshield 18 may separate an interior passenger compartment 22 of the device 12 from an external environment 24 in which the device 12 operates. Alternatively, for non-automotive applications, the windshield 18 may be a visor of a helmet, a lens of eyeglasses or goggles, and the like.

As described with continued reference to FIG. 1, the device 12 also includes an operator eyebox 26 spaced apart from the windshield 18. The operator eyebox 26 may generally correspond to an area in which a head 28 of the operator 16 may move while the operator 16 gazes ahead through the windshield 18. That is, the operator eyebox 26 may correspond to a box situated directly in front of the operator 16 through which the operator 16 may view the primary image 14 presented by the head-up display system 10 without tilting and/or rotating his head 28 more than about 20° up, down, left, and/or right. Stated differently, the operator eyebox 26 may be a virtual space defined by an optical design of the head-up display system 10 in which an operator is able to view an entirety of the primary image 14 when the operator's eyes are located within the operator eyebox 26.

Referring again to FIG. 1, the device 12 further includes the head-up display system 10. The head-up display system 10 is configured for producing the crisp, clear, high-contrast primary image 14 visible at the windshield 18 when viewed from the operator eyebox 26.

Referring now to FIG. 2, the head-up display system 10 includes a housing 30. The housing 30 may be formed from, for example, a durable plastic, and may enclose and protect various components of the head-up display system 10. That is, the housing 30 may package one or more optical components of the head-up display system 10. Further, the housing 30 has an interior surface 32 and defines a cavity 34 configured for receiving the ray of light 20 (FIG. 1), e.g., the solar ray of light 220 (FIG. 1) and/or the first ray of light 120 (FIG. 1), as set forth in more detail below. That is, the housing 30 may have a plurality of interior surfaces 32 and form a box that defines the cavity 34.

In addition, referring again to FIG. 1, the head-up display system 10 may also include a projector 36 configured for emitting the first ray of light 120 into the cavity 34. The first ray of light 120 may be polarized light. In particular, the first ray of light 120 may have an s-polarization state or a p-polarization state. The projector 36 may be a suitable light source arranged to emit the first ray of light 120. For example, the projector 36 may include optics to focus, magnify, refract, and/or reflect light, and may define one or more apertures (not shown). In a non-limiting example, the projector 36 may emit the first ray of light 120 from a light-emitting diode.

Further, the head-up display system 10 may also include a lens 38 disposed within the cavity 34 and facing the projector 36. The lens 38 may be configured for reflecting the ray of light 20, e.g., the first ray of light 120 and/or the solar ray of light 220, towards the interior surface 32. Further, the lens 38 may be configured for reflecting the ray of light 20 out of the cavity 34, although some light may be received by and remain within the cavity 34. In one embodiment, the lens 38 may be characterized as a mirror and may be disposed between the operator 16 and the windshield 18. The lens 38 may redirect or reflect the ray of light 20 projected from the projector 36 in such a way so that a field of view through the windshield 18 and the primary image 14 are visible at the same time by the operator 16.

Figure 3:
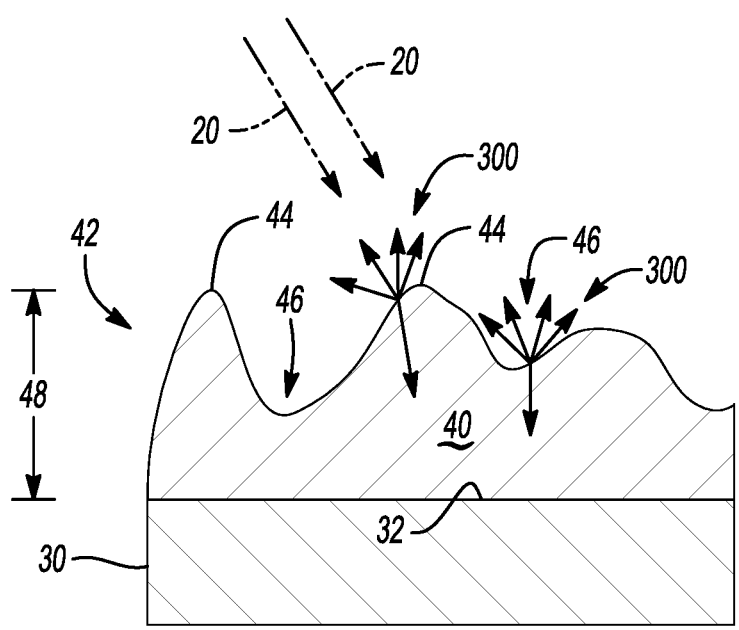
FIG. 3 is a schematic illustration of a cross-sectional view of a first cured film disposed on the interior surface of FIG. 2, taken along section line 3-3.
Figure 4:
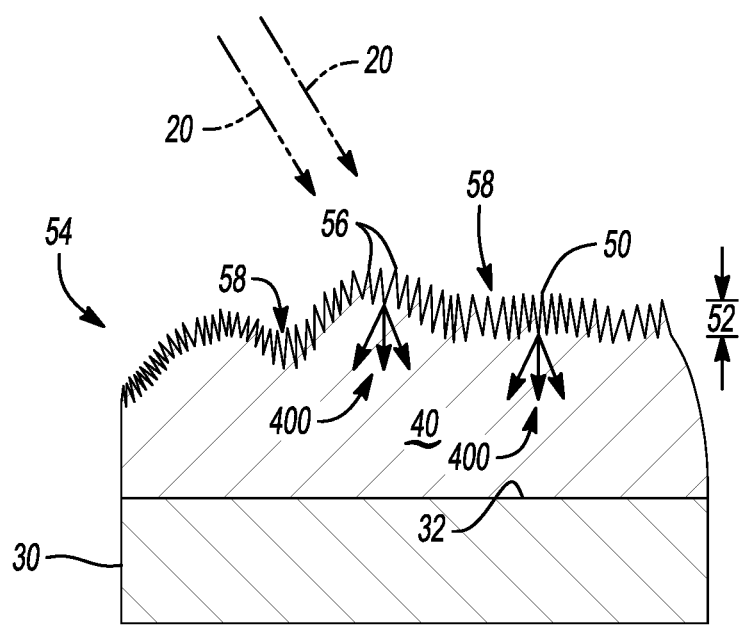
FIG. 4 is a schematic illustration of a cross-sectional view of a second deposited film disposed on the first cured film of FIG. 3.

Referring now to FIGS. 3 and 4, the head-up display system 10 also includes a first cured film 40 formed from a coating composition, disposed on the interior surface 32 or each of the plurality of interior surfaces 32, and configured for absorbing the ray of light 20, e.g., the first ray of light 120 and the solar ray of light 220, within the cavity 34. That is, the first cured film 40 may be a paint or a plastic or a coating that covers the interior surface 32 and serves as an absorber of the ray of light 20 within the cavity 34. For example, the first cured film 40 may have a black appearance and a sheen that may not be completely matte. Therefore, as best shown in FIG. 3, as the ray of light 20 contacts the first cured film 40, the ray of light 20 may bounce off the first cured film 40 (Fresnel reflection) and scatter within the cavity 34 to form stray, scattered light 300 within the cavity 34.

More specifically, as best shown in FIG. 3, the first cured film 40 may be at least partially light-reflective such that the first cured film 40 may not absorb at least some of the ray of light 20, e.g., the solar ray of light 220 and/or the first ray of light 120. In particular, the first cured film 40 may have a first structure 42 including a first plurality of peaks 44 and a first plurality of troughs 46 each defined between adjacent ones of the first plurality of peaks 44. That is, the first structure 42 may provide the first cured film 40 with a rough surface. In particular, each of the first plurality of peaks 44 may have a first height 48 of less than 1 mm such that the first structure 42 may be measurable on a sub-millimeter scale. For example, each of the first plurality of peaks 44 may have a first height 48 of from 0.1 mm to 0.9 mm, or from 0.25 mm to 0.75 mm. As such, the first cured film 40 may be both light-absorptive but also light-reflective due to the first structure 42.

Referring now to FIG. 4, to overcome reflection of the ray of light 20 by the first cured film 40 due to Fresnel reflection, the head-up display system 10 also includes a second deposited film 50 formed from an ionized gas composition and disposed on the first cured film 40. That is, the second deposited film 50 may be formed by an ionized gas treatment of the first cured film 40, as set forth in more detail below. Further, the second deposited film 50 is configured for transmitting the ray of light 20, e.g., the solar ray of light 220 and the first ray of light 120, to the first cured film 40 to thereby minimize scatter of the ray of light 20 within the cavity 34 and produce the primary image 14 having enhanced contrast within the operator eyebox 26. More specifically, the second deposited film 50 may be configured for transmitting the ray of light 20 to the first cured film 40 to thereby minimize scatter of the ray of light 20 within the cavity 34 and prevent stray light or scattered light 300 (FIG. 3) from contaminating the primary image 14 within the operator eyebox 26. That is, the second deposited film 50 may compensate for the reflective properties of the first cured film 40 to increase light absorption (shown generally at 400 of FIG. 4) and reduce stray, scattered light 300 (FIG. 3) within the cavity 34 to thereby enhance contrast of the primary image 14.

As such, the second deposited film 50 may be characterized as an anti-reflection film. That is, the second deposited film 50 may be antireflective such that the second deposited film 50 may transmit at least some of the ray of light 20 to the first cured film 40. For example, the second deposited film 50 may transmit at least some of the solar ray of light 220 and/or at least some of the first ray of light 120 to the first cured film 40. Stated differently, the second deposited film 50 may be configured as an anti-reflection film to enhance absorption of the ray of light 20 by the first cured film 40 to thereby minimize scatter of the ray of light 20 within the cavity 34.

In one non-limiting example, the second deposited film 50 may have a thickness 52 of from 35 µm to 65 µm, e.g., from 40 µm to 55 µm, or 50 µm, and the second deposited film 50 may be configured for minimizing a Fresnel reflection of the ray of light 20 from the first cured film 40 such that the housing 30 is light-absorptive. As used herein, the terminology Fresnel reflection refers to a reflection of a portion of incident light at an interface between two materials. The second deposited film 50 may be characterized as a 1% deposited coating such that the second deposited film 50 reflects solely 1% of the ray of light 20 off the first cured film 40. That is, the second deposited film 50 may have an antireflective function and may transmit most of the ray of light 20 to the first cured film 40.

Figure 5:
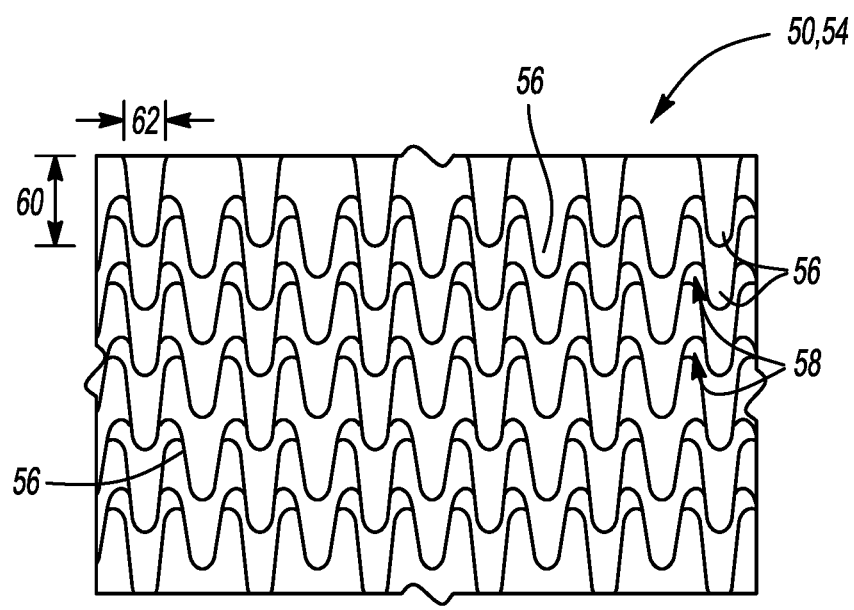
FIG. 5 is a schematic illustration of a perspective, magnified view of a portion of the second deposited film of FIG. 4.

More specifically, as best shown in FIGS. 4 and 5, the second deposited film 50 may have a moth-eye structure 54 including a second plurality of peaks 56 and a second plurality of troughs 58 each defined between adjacent ones of the second plurality of peaks 56. That is, the moth-eye structure 54 may mimic a structure of an eye of a moth and may disrupt and minimize the reflectance of the ray of light 20. In particular, each of the second plurality of peaks 56 may have a second height 60 of less than 1 micron such that the moth-eye structure 54 may be measurable on a sub-micron scale. For example, each of the second plurality of peaks 56 may have the second height 60 of from 10 nm to 100 nm such that the moth-eye structure 54 may be measurable on a nanometer scale. Further, each of the second plurality of peaks 56 may have the second height 60, a second width 62, and an aspect ratio of the second height 60 to the second width 62 of greater than or equal to 2:1, e.g., 3:1 or 4:1 or 5:1.

The second deposited film 50 may be formed on the first cured film 40 by argon ion plasma etching. That is, the ion gas composition may be a plasma that includes positive argon ions and free electrons in a proportion that results in no overall electric charge. The plasma may be generated under comparatively low pressures and comparatively high temperatures and may be an ionized gas composition that is electrified with additional electrons having a negative and a positive charge. For example, the argon ion plasma etching may occur within a vacuum deposition chamber equipped with a plasma source. During the argon ion plasma etching, a reactive gas such as oxygen may be partially ionized by the argon plasma emitted from the plasma source. Then, argon ions and oxygen ions may impinge the first cured film 40 and form the second deposited film 50 having the moth-eye structure 54. The deposition or manufacturing process for the moth-eye structure 54 may be comparatively more stable than processes such as sputter coating, physical vapor deposition, and chemical vapor deposition.

Therefore, although not shown, a method of forming the second deposited film 50 on the first cured film 40 disposed on the interior surface 32 of the head-up display system 10 includes plasma etching a plurality of argon ions onto the first cured film 40 to form the moth-eye structure 54 including the second plurality of peaks 56 and the second plurality of troughs 58, and minimizing a Fresnel reflection of the ray of light 20 from the first cured film 40 such that the housing 30 is light-absorptive.

Therefore, the second deposited film 50 may further diminish a presence of stray or scattered light 300 (FIG. 3) and instead increase a luminance of the primary image 14 such that the head-up display system 10 solely presents a crisp, bright, and clear primary image 14 that is free from lack of clarity and lack of contrast. Further, as described by comparing the stray or scattered light 300 of FIG. 3 to the absorbed light 400 of FIG. 4, as the ray of light 20 contacts the second deposited film 50, the second deposited film 50 may absorb the thermal load and maintain a cool housing 30 even during clear, sunny operating conditions, and may absorb the stray or scattered light 300 to produce a crisp, clear, high-contrast primary image 14. More specifically, the ray of light 20 may not reflect off the housing 30 to the operator eyebox 26 during operation of the head-up display system 10. That is, as best shown in FIG. 1, the ray of light 20 may not be visible at the windshield 18 when viewed from the operator eyebox 26 and may therefore not diminish a contrast or clarity of the primary image 14. Further, the stray or scattered light 300 may not be present near the primary image 14. As such, the second deposited film 50 may be characterized as a stray light manager for the head-up display system 10 and may contribute to the crisp, bright, and clear primary image 14.

Therefore, during operation of the head-up display system 10, the primary image 14 is presented through the windshield 18 as a clear, high-contrast, single, bright image with increased luminance. Advantageously, since the second deposited film 50 absorbs stray or scattered light 300, the primary image 14 may not be diminished by the scattered light 300 within the cavity 34 so that the head-up display system 10 presents clear, singular, bright, and crisp primary images 14 during operation and mitigates thermal load and stray light reflection.

While the best modes for carrying out the disclosure have been described in detail, those familiar with the art to which this disclosure relates will recognize various alternative designs and embodiments for practicing the disclosure within the scope of the appended claims.

What is claimed is:

1. A head-up display system comprising:
a housing having an interior surface and defining a cavity configured for receiving a visible ray of light;
a lens disposed within the cavity and configured for reflecting the visible ray of light towards the interior surface;
a first cured film formed from a coating composition, disposed on the interior surface, and configured for both absorbing the visible ray of light within the cavity at the interior surface and scattering the visible ray of light off the interior surface such that the first cured film is at least partially light-reflective; and
a second deposited film formed from an ionized gas composition and disposed on the first cured film;
wherein the second deposited film is a 1% deposited coating that reflects 1% of the visible ray of light off the first cured film and is configured for transmitting the visible ray of light to the first cured film to thereby increase absorption of the visible ray of light by the first cured film and minimize scatter of the visible ray of light within the cavity such that the housing is light-absorptive;
wherein the second deposited film has a thickness of from 35 µm to 65 µm.

2. The head-up display system of claim 1, wherein the first cured film has a first structure including a first plurality of peaks and a first plurality of troughs each defined between adjacent ones of the first plurality of peaks.

3. The head-up display system of claim 2, wherein each of the first plurality of peaks has a first height of less than 1 mm such that the first structure is measurable on a sub-millimeter scale.

4. The head-up display system of claim 1, wherein the second deposited film is antireflective such that the second deposited film transmits at least some of the visible ray of light to the first cured film.

5. The head-up display system of claim 4, wherein the second deposited film has a moth-eye structure including a second plurality of peaks and a second plurality of troughs each defined between adjacent ones of the second plurality of peaks.

6. The head-up display system of claim 5, wherein each of the second plurality of peaks has a second height of less than 1 micron such that the moth-eye structure is measurable on a sub-micron scale.

7. The head-up display system of claim 6, wherein each of the second plurality of peaks has a second height of from 10 nm to 100 nm such that the moth-eye structure is measurable on a nanometer scale.

8. The head-up display system of claim 6,
wherein the second deposited film is configured for minimizing a Fresnel reflection of the visible ray of light from the first cured film.

9. The head-up display system of claim 6, wherein each of the second plurality of peaks has a second height, a second width, and an aspect ratio of the second height to the second width of greater than or equal to 5:1.

10. The head-up display system of claim 1, wherein the second deposited film is formed on the first cured film by argon ion plasma etching.

11. The head-up display of claim 10, wherein the first cured film has a first structure including a first plurality of peaks and a first plurality of troughs each defined between adjacent ones of the first plurality of peaks, and wherein the second deposited film has a moth-eye structure including a second plurality of peaks and a second plurality of troughs each defined between adjacent ones of the second plurality of peaks.

12. A head-up display system comprising:
a housing having an interior surface and defining a cavity configured for receiving a solar ray of light;
a projector configured for emitting a visible first ray of light into the cavity;
a lens disposed within the cavity and facing the projector, wherein the lens is configured for reflecting the visible first ray of light and the solar ray of light towards the interior surface;
a first cured film formed from a coating composition, disposed on the interior surface, and configured for both absorbing the visible first ray of light and the solar ray of light within the cavity at the interior surface and scattering the visible first ray of light and the solar ray of light off the interior surface such that the first cured film is at least partially light-reflective; and
a second deposited film formed from an ionized gas composition and disposed on the first cured film;
wherein the second deposited film is a 1% deposited coating that reflects 1% of the visible ray of light off the first cured film and is configured for transmitting the visible first ray of light and the solar ray of light to the first cured film to thereby increase absorption of the visible first ray of light and the solar ray of light by the first cured film and minimize scatter of the visible first ray of light and the solar ray of light within the cavity such that the housing is light-absorptive;
wherein the second deposited film has a thickness of from 35 µm to 65 µm.

13. The head-up display system of claim 12, wherein the first cured film does not absorb at least some of the solar ray of light and at least some of the visible first ray of light, and the second deposited film is antireflective such that the second deposited film transmits at least some of the solar ray of light and at least some of the visible first ray of light to the first cured film.

14. The head-up display system of claim 13, wherein each of the second plurality of peaks has a second height of from 10 nm to 100 nm such that the moth-eye structure is measurable on a nanometer scale, and wherein each of the first plurality of peaks has a first height of less than 1 mm such that the first structure is measurable on a sub-millimeter scale.

15. The head-up display system of claim 13, wherein each of the second plurality of peaks has a second height, a second width, and an aspect ratio of the second height to the second width of greater than or equal to 5:1.

16. A device comprising:
a windshield;
an operator eyebox spaced apart from the windshield; and
a head-up display system configured for producing a primary image visible at the windshield when viewed from the operator eyebox, the head-up display system including:
a housing having an interior surface and defining a cavity configured for receiving a visible ray of light;
a lens disposed within the cavity and configured for reflecting the visible ray of light towards the interior surface;
a first cured film formed from a coating composition, disposed on the interior surface, and configured for both absorbing the visible ray of light within the cavity at the interior surface and scattering the visible ray of light off the interior surface such that the first cured film is at least partially light-reflective; and
a second deposited film formed from an ionized gas composition and disposed on the first cured film;
wherein the second deposited film is a 1% deposited coating that reflects 1% of the visible ray of light off the first cured film and is configured for transmitting the visible ray of light to the first cured film to thereby minimize scatter of the visible ray of light within the cavity and produce the primary image within the operator eyebox such that the housing is light-absorptive;
wherein the second deposited film has a thickness of from 35 µm to 65 µm.

17. The device of claim 16, wherein the housing has a plurality of interior surfaces and further wherein the first cured film is disposed on each of the plurality of interior surfaces.

18. The device of claim 16, wherein the first cured film has a first structure including a first plurality of peaks and a first plurality of troughs each defined between adjacent ones of the first plurality of peaks, and wherein each of the first plurality of peaks has a first height of less than 1 mm such that the first structure is measurable on a sub-millimeter scale.

19. The device of claim 18, wherein the second deposited film has a moth-eye structure including a second plurality of peaks and a second plurality of troughs each defined between adjacent ones of the second plurality of peaks; and wherein each of the second plurality of peaks has a second height of from 10 nm to 100 nm such that the moth-eye structure is measurable on a nanometer scale.

20. The device of claim 16, wherein the second deposited film is configured for minimizing a Fresnel reflection of the visible ray of light from the first cured film.

* * * * *